United States Patent
Raindel et al.

(10) Patent No.: US 10,331,595 B2
(45) Date of Patent: Jun. 25, 2019

(54) COLLABORATIVE HARDWARE INTERACTION BY MULTIPLE ENTITIES USING A SHARED QUEUE

(71) Applicant: Mellanox Technologies Ltd., Yokneam (IL)

(72) Inventors: Shachar Raindel, Haifa (IL); Liran Liss, Atzmon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 611 days.

(21) Appl. No.: 14/918,599

(22) Filed: Oct. 21, 2015

(65) Prior Publication Data

US 2016/0117277 A1    Apr. 28, 2016

Related U.S. Application Data

(60) Provisional application No. 62/067,465, filed on Oct. 23, 2014.

(51) Int. Cl.
| | |
|---|---|
| *G06F 13/38* | (2006.01) |
| *G06F 13/40* | (2006.01) |
| *G06F 13/42* | (2006.01) |
| *G06F 9/54* | (2006.01) |

(52) U.S. Cl.
CPC ............ *G06F 13/385* (2013.01); *G06F 9/546* (2013.01); *G06F 13/404* (2013.01); *G06F 13/4068* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 6,912,604 B1 * | 6/2005 | Tzeng | ................... | G06F 13/387 370/412 |
| 7,149,817 B2 * | 12/2006 | Pettey | .................... | H04L 29/06 709/250 |
| 7,152,122 B2 * | 12/2006 | Kagan | ................. | G06F 13/1605 709/243 |

(Continued)

FOREIGN PATENT DOCUMENTS

| | | | |
|---|---|---|---|
| JP | 2010157254 A | * | 7/2010 |
| WO | 2013136355 A1 | | 9/2013 |
| WO | 2013180691 A1 | | 12/2013 |

OTHER PUBLICATIONS

'An Introduction to InfiniBand—Bringing I/O up to speed' Whitepaper, copyright 2001, JNI Corporation.*

(Continued)

*Primary Examiner* — Steven G Snyder
(74) *Attorney, Agent, or Firm* — Kligler & Associates

(57) ABSTRACT

A method for interaction by a central processing unit (CPU) and peripheral devices in a computer includes allocating, in a memory, a work queue for controlling a first peripheral device of the computer. The CPU prepares a work request for insertion in the allocated work queue, the work request specifying an operation for execution by the first peripheral device. A second peripheral device of the computer submits an instruction to the first peripheral device to execute the work request that was prepared by the CPU and thereby to perform the operation specified by the work request.

35 Claims, 2 Drawing Sheets

(56) References Cited

U.S. PATENT DOCUMENTS

| | | | | |
|---|---|---|---|---|
| 7,234,004 | B2* | 6/2007 | Raisch | G06F 13/385 710/310 |
| 7,529,886 | B2* | 5/2009 | Emmes | G06F 13/4022 710/20 |
| 7,552,240 | B2* | 6/2009 | Boyd | G06F 9/5011 710/1 |
| 7,752,370 | B2* | 7/2010 | Ma | G06F 9/544 710/263 |
| 7,996,583 | B2* | 8/2011 | Wilkinson | H04L 12/64 370/360 |
| 9,143,467 | B2* | 9/2015 | Kagan | H04L 49/9031 |
| 9,304,813 | B2* | 4/2016 | Vembu | G06F 9/4881 |
| 9,424,223 | B2* | 8/2016 | Nasu | G06F 13/409 |
| 9,489,245 | B2* | 11/2016 | Llamas | G06F 9/52 |
| 9,575,825 | B2* | 2/2017 | Arimilli | G06F 9/546 |
| 9,747,122 | B2* | 8/2017 | Serebrin | G06F 9/45558 |
| 2002/0152327 | A1* | 10/2002 | Kagan | G06F 13/1605 709/250 |
| 2003/0065856 | A1* | 4/2003 | Kagan | G06F 13/387 710/263 |
| 2005/0138230 | A1* | 6/2005 | Raisch | G06F 13/385 710/15 |
| 2006/0095606 | A1* | 5/2006 | Emmes | G06F 13/4022 710/46 |
| 2006/0288125 | A1* | 12/2006 | Boyd | G06F 9/5011 710/1 |
| 2008/0256280 | A1* | 10/2008 | Ma | G06F 9/4812 710/263 |
| 2012/0192190 | A1* | 7/2012 | Basso | G06F 15/1735 718/102 |
| 2012/0198284 | A1* | 8/2012 | Li | G06F 11/362 714/42 |
| 2012/0229481 | A1* | 9/2012 | McCrary | G06F 9/5044 345/522 |
| 2013/0103777 | A1* | 4/2013 | Kagan | H04L 49/9031 709/212 |
| 2013/0332640 | A1* | 12/2013 | Nasu | G06F 13/409 710/301 |
| 2014/0026137 | A1* | 1/2014 | Vembu | G06F 9/4881 718/102 |
| 2014/0122838 | A1* | 5/2014 | Llamas | G06F 9/52 712/220 |
| 2015/0288624 | A1 | 10/2015 | Raindel et al. | |
| 2015/0317280 | A1* | 11/2015 | Magro | G06F 15/17 710/301 |
| 2015/0347328 | A1* | 12/2015 | Dominguez | G06F 13/24 710/267 |
| 2016/0179591 | A1* | 6/2016 | Arimilli | G06F 9/546 710/316 |
| 2016/0299858 | A1* | 10/2016 | Ching | G06F 13/24 |
| 2017/0069054 | A1* | 3/2017 | Ramadoss | G06T 1/20 |
| 2019/0034381 | A1* | 1/2019 | Burstein | G06F 15/167 |

OTHER PUBLICATIONS

'InfiniBand Architecture Specification vol. 2' Release 1.3, Nov. 6, 2012.*
'An Introduction to the InfiniBand Architecture' by Odysseas Pentakalos, Feb. 4, 2002.*
'Survey on System I/O Hardware Transactions and Impact on Latency, Throughput, and Other Factors' by Steen Larsen and Ben Lee, Jan. 11, 2014.*
'PacketShader: a GPU-Accelerated Software Router' by Sangjin Han et al., copyright 2010, ACM.*
'Fast and Flexible: Parallel Packet Processing with GPUs and Click' by Weibin Sun and Robert Ricci, Symposium on Architectures for Networking and Communications Systems (ANCS), 2013 ACM/IEEE.*
'Infiniband-Verbs on GPU: A case study of controlling an Infiniband network device from the GPU' by Lena Oden et al., 2014 IEEE 28th International Parallel & Distributed Processing Symposium Workshops, May 19-23, 2014.*
'GPUnet: Networking Abstractions for GPU Programs' by Sangman Kim et al., Proceedings of the 11th USENIX Symposium on Operating Systems Design and Implementation, Oct. 6-8, 2014.*
'Extended Task Queuing: Active Messages for Heterogeneous Systems' by Michael LeBeane et al., copyright 2016, IEEE.*
Infiniband Trade Association, "InfiniBandTM Architecture Specification vol. 1", Release 1.2.1, Nov. 2007.
PCI Express® Base Specification, Revision 3.1, 1073 pages, Mar. 2014.

* cited by examiner

COLLABORATIVE HARDWARE INTERACTION BY MULTIPLE ENTITIES USING A SHARED QUEUE

CROSS-REFERENCE TO RELATED APPLICATIONS

This application claims the benefit of U.S. Provisional Patent Application 62/067,465, filed Oct. 23, 2015, which is incorporated herein by reference.

FIELD OF THE INVENTION

The present invention relates generally to computer systems, and particularly to control of and interaction with peripheral devices in a computer system.

BACKGROUND

Switched-fabric communication architectures are widely used in high-performance computing. Examples of such architectures include InfiniBand™ and high-speed Ethernet™. Computing devices (host processors and peripherals) connect to the switched fabric via a network interface controller (NIC), which is referred to in InfiniBand (IB) parlance as a channel adapter. Host processors (or hosts) use a host channel adapter (HCA), while peripheral devices use a target channel adapter (TCA).

Client processes, such as software application processes, running on a host processor communicate with the transport layer of the fabric by manipulating a transport service instance, known as a "queue pair" (QP), which is made up of a send queue (SQ) and a receive queue (RQ). To send and receive messages over the network using a HCA, the client submits work requests (WRs), which cause work items, known as work queue elements (WQEs), to be placed in the appropriate work queues in the host memory for execution by the HCA. After it has finished servicing a WQE, the HCA typically writes a completion report, in the form of a completion queue element (CQE), to a completion queue in the host memory, to be read by the client process as an indication that the work request has been executed.

InfiniBand specifies a number transport services, which support process-to-process communications between hosts over a network. In general, reliable IB transport services require a dedicated QP for each pair of requester and responder processes. In some cases, however, a single receive QP may be shared by multiple processes running on a given host. For example, the Extended Reliable Connected (XRC) transport service enables each process to maintain a single send QP for each host, rather than to each remote process, while a receive QP is established per remote send QP and can be shared among all the processes on the host.

Although the above terminology and some of the embodiments in the description that follows are based on features of the IB architecture and use vocabulary taken from IB specifications, similar mechanisms exist in networks and I/O devices that operate in accordance with other protocols, such as Ethernet, OmniPath, iWARP and Fibre Channel. The IB terminology and features are used herein by way of example, for the sake of convenience and clarity, and not by way of limitation.

In some communication networks, a network node processes data received over the network using a local co-processor, also referred to as an accelerator or peer device. Various methods for delivering data to the accelerator are known in the art. For example, PCT International Publication WO 2013/180691, whose disclosure is incorporated herein by reference, describes devices coupled via one or more interconnects. In one embodiment, a Network Interface Card (NIC), such as a Remote Direct Memory Access (RDMA) capable NIC, transfers data directly into or out of the memory of a peer device that is coupled to the NIC via one or more interconnects, bypassing a host computing and processing unit, a main system memory or both.

PCT International Publication WO 2013/136355, whose disclosure is incorporated herein by reference, describes a network node that performs parallel calculations on a multi-core GPU. The node comprises a host and a host memory on which a calculation application can be installed, a GPU with a GPU memory, a bus and a Network Interface Card (NIC). The NIC comprises means for receiving data from the GPU memory and metadata from the host over the bus, and for routing the data and metadata towards the network. The NIC further comprises means for receiving data from the network and for providing the data to the GPU memory over the bus. The NIC thus realizes a direct data path between the GPU memory and the network, without passing the data through the host memory.

SUMMARY

Embodiments of the present invention that are described hereinbelow provide improved methods for interaction between a host processor and peripheral devices, as well as computers and systems implementing such methods.

There is therefore provided, in accordance with an embodiment of the invention, a method for interaction by a central processing unit (CPU) and peripheral devices in a computer. The method includes allocating, in a memory, a work queue for controlling a first peripheral device of the computer. The CPU prepares a work request for insertion in the allocated work queue. The work request specifies an operation for execution by the first peripheral device. An instruction is submitted from a second peripheral device of the computer to the first peripheral device, to execute the work request that was prepared by the CPU and thereby to perform the operation specified by the work request.

In some embodiments, preparing the work request includes writing the work request to the work queue by the CPU, and submitting the instruction includes activating the work request by the second peripheral device. In a disclosed embodiment, the CPU and the first and second peripheral devices are connected to a bus of the computer, and activating the work request includes writing a doorbell record to an address of the first peripheral device on the bus.

Alternatively or additionally, preparing the work request includes writing the work request, by the CPU, to a temporary storage area, and submitting the instructions includes copying the work request, by the second peripheral device, from the temporary storage area to the work queue.

In some embodiments, the first peripheral device includes an input/output (I/O) device, the specified operation includes an I/O operation, and the second peripheral device includes a co-processor. In a disclosed embodiment, the co-processor includes a graphics processing unit (GPU), and the I/O operation includes transferring data processed by the GPU. Additionally or alternatively, the I/O device includes a network interface controller (NIC), which couples the computer to a network, and the I/O operation includes transmitting data packets over the network.

In a disclosed embodiment, the method includes receiving, in a completion queue, a completion report written by the first peripheral device upon completion of the operation.

The completion report is read by the second peripheral device, which in response to the completion report, performs a further operation.

There is also provided, in accordance with an embodiment of the invention, a method for interaction by a central processing unit (CPU) and peripheral devices in a computer. The method includes submitting to a first peripheral device in the computer a request to perform a first operation with respect to specified data. A completion report written by the first peripheral device upon completion of the first operation is received in a completion queue in a memory. The completion report is read from the memory by a second peripheral device in the computer and, in response to the completion report, the second peripheral device performs a second operation. In response to the completion report, the CPU records that the request to perform the first operation has been completed.

In some embodiments, reading the completion report includes polling the completion queue for receipt of the completion report. In a disclosed embodiment, polling the completion queue includes polling the completion queue by the CPU in addition to the polling by the second peripheral device. Typically, the second peripheral device polls the completion queue at a higher frequency than the CPU.

Additionally or alternatively, the method includes passing, in response to the completion report, a notification from the second peripheral device to the CPU that the completion report was received, wherein the notification causes the CPU to record that the first operation has been completed.

In some embodiments, the first peripheral device includes an input/output (I/O) device, the first operation includes an I/O operation, and the second peripheral device includes a co-processor. In a disclosed embodiment, the co-processor includes a graphics processing unit (GPU), and the I/O operation includes receiving data, and the second operation includes processing the received data by the GPU. Additionally or alternatively, the I/O device includes a network interface controller (NIC), which couples the computer to a network, and the I/O operation includes receiving data packets over the network.

There is additionally provided, in accordance with an embodiment of the invention, computing apparatus, including a memory, a first peripheral device, and a second peripheral device. A central processing unit (CPU) is configured to allocate, in the memory, a work queue for controlling the first peripheral device and to prepare a work request for insertion in the allocated work queue. The work request specifies an operation for execution by the first peripheral device. The second peripheral device is configured to submit an instruction to the first peripheral device to execute the work request that was prepared by the CPU and thereby to perform the operation specified by the work request.

There is further provided, in accordance with an embodiment of the invention, computing apparatus, including a memory and a first peripheral device, which is configured to receive a request to perform a first operation with respect to specified data and to write to a completion queue in the memory a completion report upon completion of the first operation. A second peripheral device is configured to read the completion report from the memory and, in response to the completion report, to perform a second operation on the specified data. A central processing unit (CPU) is configured to record, in response to the completion report, that the request to perform the first operation has been completed.

The present invention will be more fully understood from the following detailed description of the embodiments thereof, taken together with the drawings in which:

DETAILED DESCRIPTION OF EMBODIMENTS

Overview

Figure 1:
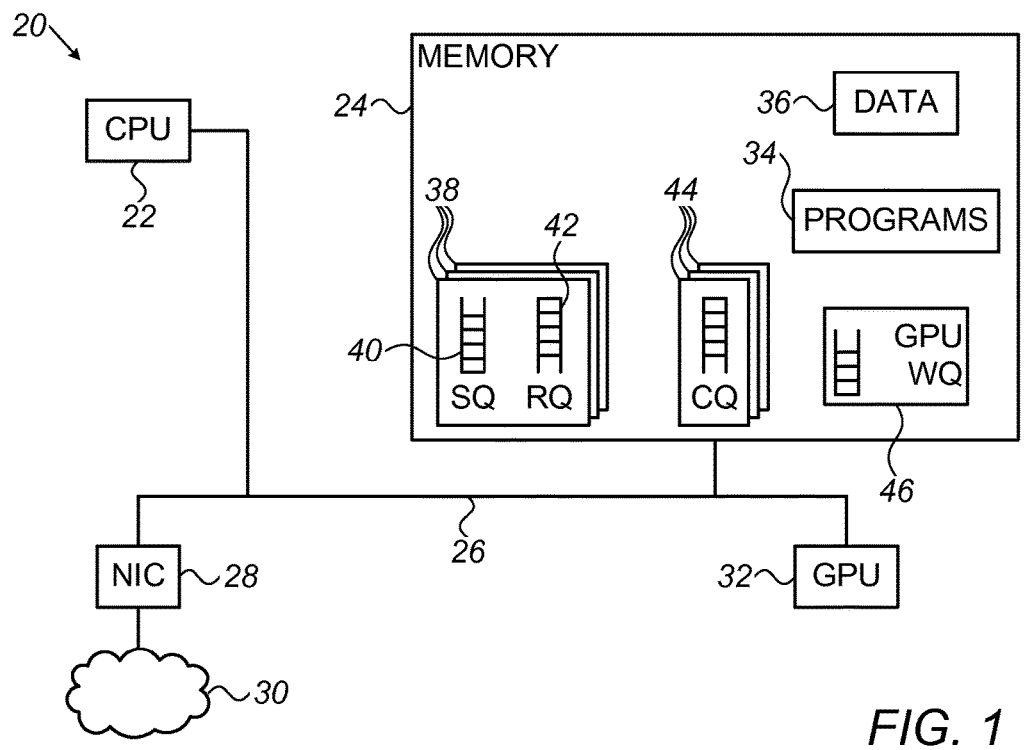
FIG. 1 is a block diagram that schematically illustrates a host computer, in accordance with an embodiment of the invention.

Many computers include one or more co-processors in addition to the main central processing unit (CPU), most commonly for use in accelerating certain types of computations. For example, graphics processing units (GPUs) are often installed in computers not only for actual graphics generation, but also for accelerating other sorts of parallelized computations. A GPU is dedicated to and optimized for performing computations of this sort, but as a result is generally not able to run a full-fledged operating system (such as Windows or Linux) or general-purpose application software. The term "co-processor," as used in the present description and in the claims, should be understood, in contrast to the CPU of the computer, to include specialized computational devices of this sort, including not only GPUs, but also other types of computational accelerators and gate-array devices. Such co-processors run alongside the CPU and are dedicated to performing specific types of processing with limited or no ability to run general-purpose software.

In some computer systems, a host computer receives large volumes of data for processing by a co-processor in the computer and/or transmits large volumes of data that have been processed by the co-processor. The data are received and transmitted in input/output (I/O) operations by an I/O device of the computer, such as a NIC or storage controller, for example. In conventional operating models, a process running on the CPU of the computer handles the I/O operations, in which data are transferred to and from the host memory by the I/O device, and interacts with the co-processor to invoke and receive the results of computations performed on the data.

This model, however, places a burden on host resources and also tends to increase the latency and decrease the overall throughput of the operations performed by the co-processor. In order to reduce these inefficiencies, a number of models have been developed in order to enable a co-processor to exchange data directly with a NIC, such as those described in the publications cited in the Background section. Another approach of this sort is described in U.S. Patent Application Publication 2015/0288624, which is assigned to the assignee of the present patent application and whose disclosure is incorporated herein by reference.

Embodiments of the present invention that are described herein take a different approach to the problem of I/O data transfer to and from a co-processor, based on collaboration between the CPU and co-processor in handling I/O operations using a shared control queue, such as a work queue or completion queue. In the disclosed embodiments, the co-processor is able to write to and/or read from the control queue in order to initiate and/or access the results of data transfers performed by an I/O device. This control queue is typically held in the host memory but may alternatively be placed in a different memory, such as a memory attached to the accelerator or to the I/O device. The bulk of the interaction with the control queue, however, in terms of composing and processing queue elements, is performed in software by a process running on the CPU. The co-processor performs only limited read and write functions, which can be implemented by native hardware logic in existing co-processor chips, possibly with minimal addition of operational capabilities.

In some embodiments, the CPU allocates a work queue in the host memory for collaborative use by the CPU and the co-processor in controlling an I/O device of the computer. To transmit or receive data, the CPU prepares work requests for insertion in this work queue, specifying the I/O operations that are to be executed by the I/O device. Once a given work request has been prepared, the co-processor submits an instruction to the I/O device to execute the work request, whereupon the I/O device performs the specified operation.

In one embodiment, the CPU itself writes the work request to the work queue and notifies the co-processor, which then activates the work request for execution. Typically, the CPU, co-processor and I/O device are connected to a bus of the computer, such as a PCI Express® (PCIe) bus, and the co-processor activates the work request by writing a doorbell record to an address that is assigned to the I/O device on the bus. Alternatively, the CPU may write the work request to a temporary storage area in the memory, and the co-processor activates the work request by copying it from the temporary storage area to the work queue. In either case, the co-processor is required to perform only simple write and copy operations, while the CPU performs the complex job of actually composing the work request.

In other embodiments, after submission of work requests to an I/O device with respect to certain specified data and completion of the requested I/O operations, the I/O device writes completion reports to a completion queue that is shared by the CPU and the co-processor. The co-processor reads the completion reports, and is thus informed that the specified data have transferred to or from the host memory. In response to this information, the co-processor performs computational operations on the data. In addition, the CPU uses the information in the completion reports to keep track of the I/O operations and record which ones have been completed. Here, too, the CPU bears the complex job of "bookkeeping," while the co-processor need only read and parse the completion reports in order to identify data to be processed and proceed with its computational functions. This sort of collaborative completion queue handling can advantageously be combined with the collaborative use of work queues that is described above; but alternatively, either of these embodiments can be used independently of the other.

Typically, the co-processor polls the completion queue for receipt of completion reports of interest. The CPU may also poll the completion queue, but generally at a lower frequency than the co-processor, since the objective of the system in this case is to accelerate processing of the data by the co-processor, while the bookkeeping tasks of the CPU can be performed with lower priority. Alternatively, upon encountering a new completion report during polling, the co-processor may notify the CPU, whereby the CPU records that the I/O operation has been completed. Further alternatively, the CPU may wait for an interrupt (or an MSI-X message), indicating that the completion queue contains new entries, and may enter a low-power mode while waiting for the completion entry to appear.

In the embodiments described hereinbelow, the co-processor comprises a GPU, which processes data that are transferred by the I/O operations in question. The I/O device in these embodiments is a NIC, which couples the computer to a network, and thus transmits and receives the data by exchanging data packets with other nodes over the network. Alternatively, however, the techniques described herein may be implemented in systems using other types of co-processors and/or other I/O devices, including storage devices.

More generally, these techniques are applicable to collaborative control of a first peripheral device in a computer by the CPU and a second peripheral device of the computer. In the disclosed embodiments, the "first peripheral device" is an I/O device, while the "second peripheral device" is a co-processor, such as a GPU or gate array. In other embodiments (not shown in the figures), the first peripheral device may be a co-processor, such as a GPU or gate array, while the second peripheral device is an I/O device, such as a NIC or storage controller. Alternatively, both the first and second peripheral devices may be co-processors, or both may be I/O devices.

Furthermore, the principles of the present invention may be applied, mutatis mutandis, in collaboration not only between a CPU and peripheral devices, but also between other sorts of entities in a computer system, including both hardware and software entities, and may be extended to collaboration among three or more entities.

System Description

FIG. 1 is a block diagram that schematically illustrates computing apparatus, in the form of a host computer 20, in accordance with an embodiment of the invention. Computer 20 comprises a general-purpose CPU 22 and a memory 24, which are connected to a bus 26, such as a PCIe bus or other suitable sort of interconnect. Peripheral components of the computer, including one or more co-processors and I/O devices, are also connected to bus 26. In the pictured embodiment, the I/O devices are represented by a NIC 28, which connects computer 20 to a packet network 30, such as an InfiniBand or Ethernet switch fabric. A GPU 32 serves as a co-processor. GPU 32 comprises multiple GPU cores, which are designed and configured for parallel, rather than sequential, processing. NIC 28 and GPU 32 typically comprise hardware logic circuits implemented in one or more integrated circuits, which may be packaged individually or, in some cases, together with CPU 22, as is known in the art.

Memory 24 contains program code, such as operating system, driver, and application programs run by CPU 22, as well as data 36. This data can be accessed not only by the CPU, but also by NIC 28 and GPU 32 by direct memory access via bus 26. The region of data 36 in memory 24 contains buffers holding data to be transmitted by NIC 28 over network 30 and for data received by NIC 28 from network 30 and written to memory 24. Alternatively, at least some of these buffers (or all of them) could be located in memory that is attached to GPU 32 or to another device in computer 20.

Similarly, GPU 32 accesses designated data buffers in order to read data for processing, and writes processed data to buffers in the memory. Processes running on CPU 22 invoke operations of GPU 32 by writing appropriate commands to a GPU work queue (WQ) 46, from which the GPU reads and executes the commands in queue order.

As noted earlier, software processes running on CPU 22 interact with NIC 28, and thus communicate over network 30, using respective queue pairs (QPs) 38 in memory 24. Typically, each QP 38 includes a send queue (SQ) 40 and a receive queue (RQ) 42. In response to the work requests submitted to QPs 38, NIC driver software posts work items (WQEs) in queues 40 and 42. NIC 28 reads and executes the WQEs and thus carries out the requested operations. Send and RDMA write WQEs (posted in SQ 40) cause the NIC to read data from memory 24 and transmit it over network 30, while receive WQEs (in RQ 42) indicate buffers in memory 24 to which NIC 28 is to write data received from the network. Upon completion of a work request, NIC 28 posts a completion report (CQE) to a completion queue 44 in memory 24, which is then read by the appropriate software process.

In embodiments of the present invention, one or more queues among work queues 40, 42 and/or completion queues 44 are shared between CPU 22 and GPU 32. On this basis, software processes running on CPU 22 continue to be responsible for composing work requests and monitoring their completion (based on received CQEs). GPU 32, however, is able to activate the work requests when the GPU is ready for their execution (for example, to transmit data after writing the results of a computation to a designated buffer in memory 24), as well as to access and act on completion reports (for example, to perform computations on data that NIC 28 has delivered to the memory). These features are described further hereinbelow.

Sharing of Work Queues

The first example described here relates to handling the preparation and submission of new work requests to NIC 28 in order transmit the results of a calculation done by GPU 32. The work request format is typically complex, requiring a considerable amount of logic to create it. For this reason, most of the work request is prepared by a process running on CPU 22, after which the GPU submits the work request to the appropriate QP 38 for execution by the NIC. "Submission" by the GPU may comprise, for example, activating a work request that has been written to the work queue by the CPU (FIG. 2) or copying the work request into the queue from temporary storage (FIG. 3). This sort of workflow reduces or eliminates the need for specialized logic in the GPU to handle work requests, while minimizing the latency of sending the data to network 30.

Figure 2:
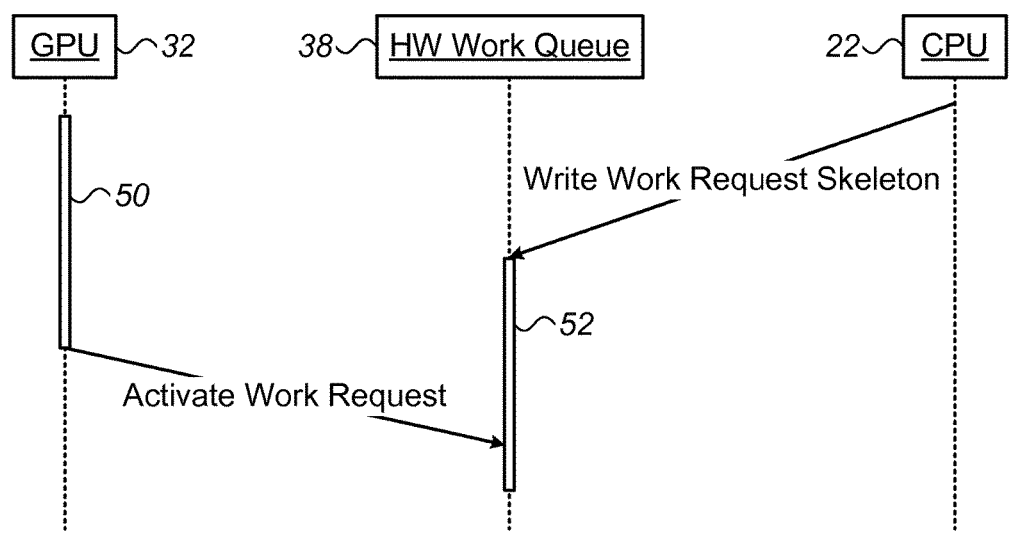
FIG. 2 is a ladder diagram that schematically illustrates a method for submission of a work request to a network interface controller (NIC), in accordance with an embodiment of the invention.
Figure 3:
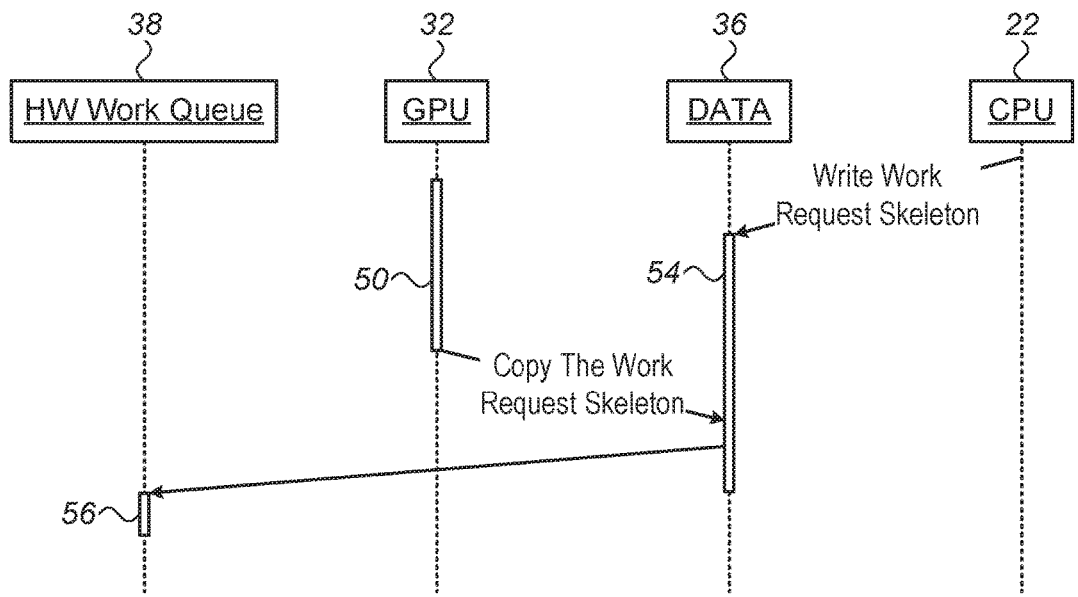
FIG. 3 is a ladder diagram that schematically illustrates a method for submission of a work request to a NIC, in accordance with another embodiment of the invention.

FIG. 2 is a ladder diagram that schematically illustrates a method for submission of a work request to NIC 28, in accordance with an embodiment of the invention. In response to one or more commands in work queue 46, GPU 32 carries out a processing flow 50, which can be lengthy, and then writes the results to a designated data buffer in memory 24. Either before or during processing flow 50, a process running on CPU 22 writes the "skeleton" of a work request 52 to send queue 40 of a QP 38 that has been allocated for collaborative use by CPU 22 and GPU 32. In the present case, work request 50 will instruct NIC 28 to read and transmit the data from a buffer to which GPU 32 has written the results of its computation. The data structure written by the CPU is referred to herein as a "skeleton" because although it contains the complete work request structure, it "comes to life," allowing NIC 28 to carry out a communication, only after activation by the GPU.

Writing of work request 52 typically involves multiple steps, such as formatting a proper work request detailing the operation requested and the parameters of the operation; fencing the host memory subsystem to ensure that the entire work request is written; and finally marking the work request as valid. This marking can be done using a "valid" bit in the work request data structure, for example, or by updating a producer index that NIC 28 afterward examines. The producer index indicates to NIC 28 the location of the last WQE in the queue that is ready for execution.

In the present embodiment, CPU 22 carries out the first steps of the operation: formatting a proper work request and writing it to send queue 40. For this purpose, the CPU locks QP 38, allocates a work queue entry, and writes the contents of the work request to the allocated entry. Typically, the CPU performs a cache flush at this stage to ensure that the write results are globally visible. The CPU does not activate the work request, however.

Instead, CPU 22 queues a command to activate the work request in GPU work queue 46, following the command to perform processing flow 50. The command specifies one or more write operations to be performed by GPU 32 in order to submit work request 52 for execution by NIC 28. For example, the command may comprise write instructions, which tell the GPU to increment the producer index of send queue 40 and to "ring the doorbell" of the NIC, i.e., to write a doorbell record to a designated doorbell address of NIC 28 on bus 26. Alternatively, GPU 32 may be configured to carry out these operations implicitly in response to a predefined "activate" command by CPU 22. In either case, once the CPU has placed the necessary command in queue 46, it unlocks QP 38.

Upon completing flow 50 and reading the subsequent activation command from queue 46, GPU 32 locks QP 38 if necessary, updates the producer index in the QP, and, in some implementations, flushes any cached data to memory 24. It then writes a doorbell record to the designated doorbell address of NIC 28, indicating the QP number and the new value of the producer index. Upon completion of these operations, GPU 32 unlocks the QP (if it was locked).

In response to the doorbell, NIC 28 reads the appropriate WQE from queue 40, and takes the action appropriate in accordance with the WQE. For example, in some cases NIC 28 reads the computation results from memory 24 and transmits the data over network 30. Alternatively, as appropriate, NIC 28 may notify a remote party that a resource (such as a memory buffer, lock, or mailbox) is available or that data is waiting for the remote party to read using an RDMA-read operation. Once the transmission is completed (and acknowledged by the receiving node, if a reliable transport service was involved), NIC 28 optionally writes an appropriate CQE to the designated completion queue 44. Alternatively, the NIC may be configured to write CQEs only intermittently and not in response to all WQEs that it executes.

Using the above mechanism, GPU 32 does not have to contain any specialized logic for posting work request 52, since CPU 22 prepares the work requests and the GPU is required only to activate them when ready. Additionally, as the activation step is part of native work queue 46 of GPU 32, the network operation by NIC 28 will necessarily be invoked and performed only after the GPU has finished the previous tasks, including flow 50. CPU 22 may thus prepare multiple work requests concurrently and place multiple, corresponding commands in GPU work queue 46, since sequential execution by GPU 32 of the commands in queue 46 will ensure that the operations are performed in the desired order. CPU 22 decides on the operations that are to be performed and the order of their performance, but the timing of execution is determined by GPU 32, and transmission of a given block of data will thus take place as soon as the GPU has completed its computations on the data.

FIG. 3 is a ladder diagram that schematically illustrates a method for submission of a work request to NIC 28, in accordance with another embodiment of the invention. In this embodiment, CPU 22 writes a work request skeleton 54 to temporary storage in the region of data 36 in memory 24, and then places a data copy command in queue 46 for execution by GPU 32. After completing processing flow 50, GPU 32 reads the copy command and, in response to the command, submits the desired work request 56 to NIC 28 by copying skeleton 54 to send queue 40. NIC 28 will then execute the command as described above.

For the purposes of this embodiment, GPU 32 needs to have only generic memory copy logic and does not have to "understand" the specifics of the work requests it is submitting to NIC 28. It is possible to implement this approach using a large number of 32-bit word writes by the GPU, thus writing the entire work request into the appropriate location and writing the doorbell record to NIC 28. Alternatively, GPU 32 may be configured to modify work request 56 slightly in the course of writing it to send queue 40. For example, the GPU may change a certain value or values (such as the length of the message to send) in skeleton 54 in response to the result of processing flow 50.

Sharing of Completion Queues

Figure 4:
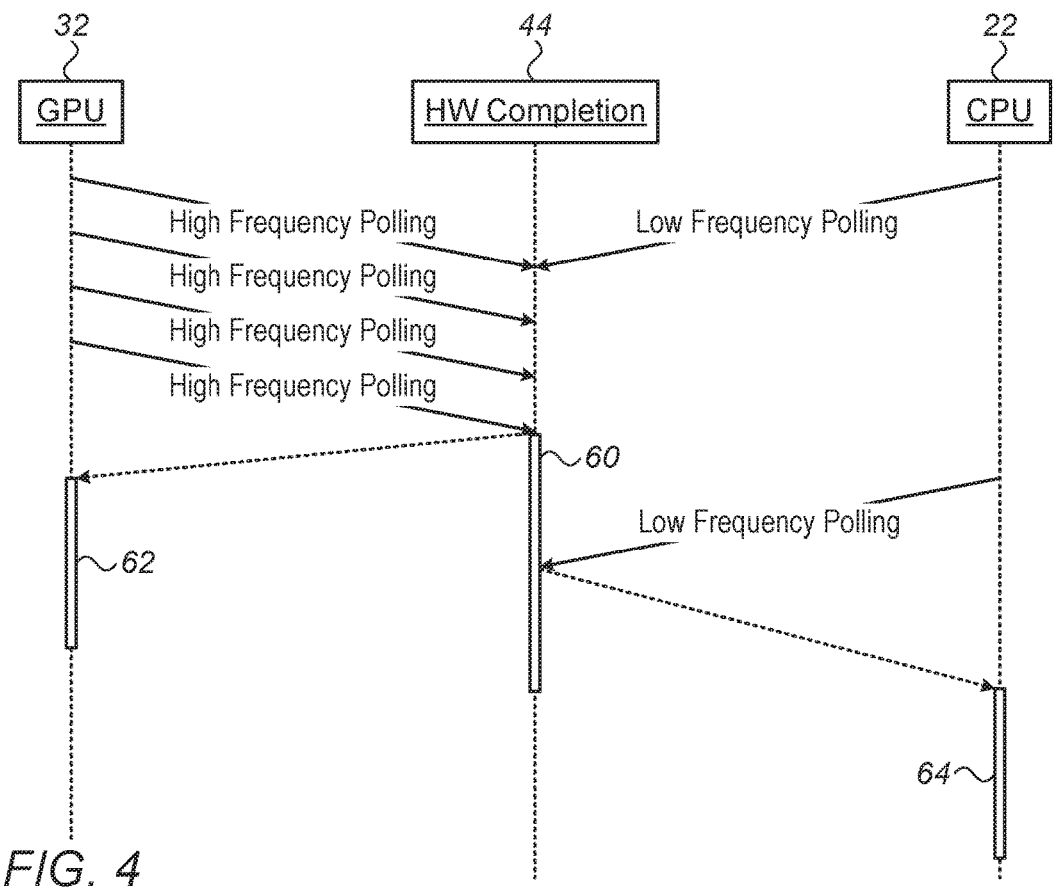
FIG. 4 is a ladder diagram that schematically illustrates a method for processing of completion reports from a NIC, in accordance with an embodiment of the invention.

FIG. 4 is a ladder diagram that schematically illustrates a method for processing of completion reports from NIC 28, in accordance with an embodiment of the invention. This model can be used to invoke immediate processing by GPU 32 of data received by NIC 28 from network 30 and written to memory 24. In this embodiment, GPU 32 polls completion queue 44 to detect a particular CQE 60 as soon as it has been written to the queue by NIC 28. The GPU will then start handling the corresponding data in memory 24, as indicated by the CQE, in a time-critical processing flow 62. In an alternative embodiment (not shown in the figures), completion queue 44 may be located on the GPU, and the GPU can then use specialized logic to detect that a CQE was written to the completion queue and trigger the appropriate polling and processing. CPU 22 may poll completion queue 44 concurrently, but typically at a lower rate, for purposes of bookkeeping 64, which is not time-critical.

To invoke CQE polling and processing by GPU 32, CPU 22 typically places a command in GPU work queue 46, instructing the GPU to poll completion queue 44 until a specified word in queue 44 receives a predefined value. For this purpose, GPU 32 may request that CPU 22 provide the appropriate descriptors for checking the entries in completion queue 44, and the CPU may also prevent the completion queue from progressing beyond the entry for which the GPU is to poll. Following the polling command, CPU 22 places a command in queue 46 for the GPU to process the data received from network 30. In this manner, GPU processing flow 62 will begin as soon as possible after the data are received.

Typically, GPU 32 will inform CPU 22 when it has detected the CQE of interest, for example by reporting to the CPU that it has completed the polling task (either by submitting an explicit report or by a write operation invoked by the descriptors queued by CPU 22). Upon receiving the indication that GPU 32 has processed the CQE, CPU 22 will complete its bookkeeping operations, which typically include updating completion queue 44 and marking the corresponding entries in work queue 40 or 42 as done. CPU 22 may perform other operations associated with the completion of the work request in question, such as posting additional work requests to queue 40 or 42, as well as application-related functions.

In some cases, after placing the polling command in GPU work queue 46, CPU 22 enters a low-power state and waits for an interrupt. When the interrupt (which may be timer- or network-related) wakes the CPU, it will also examine the completion queue 44 and will take care of the required bookkeeping activities when appropriate. For example, upon determining, based on the received CQEs, that one or more receive WQEs in RQ 42 (and the corresponding buffers in memory 24) have been consumed, CPU 22 may replenish the supply of receive WQEs and buffers. Assuming the CPU has prepared a sufficiently large supply of receive WQEs and buffers in advance, such replenishing can take place at a low frequency relative to the rate at which NIC 28 consumes these WQEs. The CPU can then replenish a large number of WQEs and buffers in a batch, thus reducing the total amount of time that the CPU spends in an active, high-power state. This sort of signaling and interaction is useful, for example, in controlling memory allocation management, in which the CPU releases the memory used for receiving data from the network after the data have been processed. The CPU can use the notifications from the GPU in this case in identifying the buffers in memory 24 that can be reused in new receive WQEs. Additionally or alternatively, either the CPU or the GPU may deliberately delay bookkeeping-related processing of the CQEs, in order to allow for work to accumulate and achieve better work batching by the CPU.

In alternative embodiments (not shown in the figures), CPU 22 may detect the receipt of CQEs in queue 44 without actually polling the queue. For example, GPU 32 may pass a notification to the CPU by copying the CQE, either as-is or in a partially-processed form, to a secondary queue that the CPU inspects for bookkeeping purposes. Alternatively, CPU 22 may rely on interrupt-based notifications that completion information is available, rather than polling.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method for interaction by a central processing unit (CPU) and peripheral devices in a computer, the method comprising:
   allocating, in a memory, a work queue for controlling a first peripheral device of the computer;
   preparing, by the CPU, a work request for insertion in the allocated work queue, the work request specifying an operation for execution by the first peripheral device; and
   submitting an instruction, from a second peripheral device of the computer to the first peripheral device, to execute the work request that was prepared by the CPU and thereby to perform the operation specified by the work request, wherein the CPU additionally queues a command to activate the work request in a work queue of the second peripheral device, and wherein submitting the instruction is performed by the second peripheral device responsively to the command to activate the work request in the work queue of the second peripheral device.

2. The method according to claim 1, wherein preparing the work request comprises writing the work request to the work queue by the CPU, and wherein submitting the instruction comprises activating the work request by the second peripheral device.

3. The method according to claim 2, wherein the CPU and the first and second peripheral devices are connected to a bus of the computer, and wherein activating the work request comprises writing a doorbell record to an address of the first peripheral device on the bus.

4. The method according to claim 1, wherein preparing the work request comprises writing the work request, by the CPU, to a temporary storage area, and wherein submitting the instructions comprises copying the work request, by the second peripheral device, from the temporary storage area to the work queue.

5. The method according to claim 1, wherein the first peripheral device comprises an input/output (I/O) device, and the specified operation comprises an I/O operation, and wherein the second peripheral device comprises a co-processor.

6. The method according to claim 5, wherein the co-processor comprises a graphics processing unit (GPU), and wherein the I/O operation comprises transferring data processed by the GPU.

7. The method according to claim 5, wherein the I/O device comprises a network interface controller (NIC), which couples the computer to a network, and wherein the I/O operation comprises transmitting data packets over the network.

8. The method according to claim 1, and comprising:
receiving, in a completion queue, a completion report written by the first peripheral device upon completion of the operation; and
reading the completion report by the second peripheral device and, in response to the completion report, performing a further operation by the second peripheral device.

9. The method according to claim 1, wherein the work queue of the second peripheral device comprises a native work queue in which the CPU instructs the second peripheral device on operations to be carried out by the second peripheral device.

10. The method according to claim 1, wherein allocating the work queue in the memory comprises allocating the work queue in a host memory of the CPU.

11. A method for interaction by a central processing unit (CPU) and peripheral devices in a computer, the method comprising:
submitting to a first peripheral device in the computer a request to perform a first operation with respect to specified data;
receiving, in a completion queue in a memory, a completion report written by the first peripheral device upon completion of the first operation;
reading the completion report from the memory by a second peripheral device in the computer and, in response to the completion report, performing a second operation by the second peripheral device; and
in response to the completion report, recording, by the CPU, that the request to perform the first operation has been completed, wherein reading the completion report comprises polling the completion queue for receipt of the completion report, and wherein the CPU additionally queues a command to poll the completion queue in a work queue of the second peripheral device, and wherein polling the completion queue for receipt of the completion report is performed by the second peripheral device responsively to the command in the work queue of the second peripheral device.

12. The method according to claim 11, wherein polling the completion queue comprises polling the completion queue by the CPU in addition to the polling by the second peripheral device.

13. The method according to claim 11, and comprising, in response to the completion report, passing a notification from the second peripheral device to the CPU that the completion report was received, wherein the notification causes the CPU to record that the first operation has been completed.

14. The method according to claim 11, wherein the first peripheral device comprises an input/output (I/O) device, and the first operation comprises an I/O operation, and wherein the second peripheral device comprises a co-processor.

15. The method according to claim 14, wherein the co-processor comprises a graphics processing unit (GPU), and wherein the I/O operation comprises receiving data, and the second operation comprises processing the received data by the GPU.

16. The method according to claim 14, wherein the I/O device comprises a network interface controller (NIC), which couples the computer to a network, and wherein the I/O operation comprises receiving data packets over the network.

17. The method according to claim 11, wherein the work queue of the second peripheral device comprises a native work queue in which the CPU instructs the second peripheral device on operations to be carried out by the second peripheral device.

18. The method according to claim 11, further comprising updating the completion queue and marking corresponding entries in a corresponding work queue of the first peripheral device as done, by the CPU, in response to the completion report.

19. A method for interaction by a central processing unit (CPU) and peripheral devices in a computer, the method comprising:
submitting to a first peripheral device in the computer a request to perform a first operation with respect to specified data;
receiving, in a completion queue in a memory, a completion report written by the first peripheral device upon completion of the first operation;
reading the completion report from the memory by a second peripheral device in the computer and, in response to the completion report, performing a second operation by the second peripheral device; and
in response to the completion report, recording, by the CPU, that the request to perform the first operation has been completed, wherein reading the completion report comprises polling the completion queue for receipt of the completion report, wherein polling the completion queue comprises polling the completion queue by the CPU in addition to the polling by the second peripheral device, and wherein the second peripheral device polls the completion queue at a higher frequency than the CPU.

20. A computing apparatus, comprising:
a memory;
a first peripheral device;
a second peripheral device; and
a central processing unit (CPU), which is configured to allocate, in the memory, a work queue for controlling the first peripheral device and to prepare a work request for insertion in the allocated work queue, the work request specifying an operation for execution by the first peripheral device, wherein the second peripheral device is configured to submit an instruction to the first peripheral device to execute the work request that was prepared by the CPU and thereby to perform the operation specified by the work request, wherein the CPU is configured to additionally queue a command to activate the work request in a work queue of the second peripheral device, and wherein the second peripheral device is configured to submit the instruction responsively to the command to activate the work request in the work queue of the second peripheral device.

21. The apparatus according to claim 20, wherein the CPU is configured to write the work request to the work queue, and the second peripheral device is configured to activate the work request in the work queue.

22. The apparatus according to claim 21, wherein the CPU and the first and second peripheral devices are connected to a bus of the computer, and wherein the second peripheral device is configured to activate the work request by writing a doorbell record to an address of the first peripheral device on the bus.

23. The apparatus according to claim 20, wherein the CPU is configured to write the work request to a temporary storage area, and wherein the second peripheral device is configured to copy the work request from the temporary storage area to the work queue.

24. The apparatus according to claim 20, wherein the first peripheral device comprises an input/output (I/O) device, and the specified operation comprises an I/O operation, and wherein the second peripheral device comprises a co-processor.

25. The apparatus according to claim 24, wherein the co-processor comprises a graphics processing unit (GPU), and wherein the I/O operation comprises transferring data processed by the GPU.

26. The apparatus according to claim 24, wherein the I/O device comprises a network interface controller (NIC), which couples the computer to a network, and wherein the I/O operation comprises transmitting data packets over the network.

27. The apparatus according to claim 20, wherein the first peripheral device is configured to write a completion report to a completion queue upon completion of the operation, and
wherein the second peripheral device is configured to read the completion report and, in response to the completion report, to perform a further operation.

28. A computing apparatus, comprising:
a memory;
a first peripheral device, which is configured to receive a request to perform a first operation with respect to specified data and to write to a completion queue in the memory a completion report upon completion of the first operation;

a second peripheral device, which is configured to read the completion report from the memory and, in response to the completion report, to perform a second operation on the specified data; and a central processing unit (CPU), which is configured to record, in response to the completion report, that the request to perform the first operation has been completed, wherein the second peripheral device is configured to poll the completion queue for receipt of the completion report, wherein the CPU is configured to additionally queue a command to poll the completion queue in a work queue of the second peripheral device, and wherein the second peripheral device is configured to poll the completion queue for receipt of the completion report responsively to the command in the work queue of the second peripheral device.

29. The apparatus according to claim 28, wherein the CPU is configured to poll the completion queue in addition to polling by the second peripheral device.

30. The apparatus according to claim 28, wherein the second peripheral device is configured to pass a notification, in response to the completion report, to the CPU that the completion report was received, wherein the notification causes the CPU to record that the first operation has been completed.

31. The apparatus according to claim 28, wherein the first peripheral device comprises an input/output (I/O) device, and the first operation comprises an I/O operation, and wherein the second peripheral device comprises a co-processor.

32. The apparatus according to claim 31, wherein the co-processor comprises a graphics processing unit (GPU), and wherein the I/O operation comprises receiving data, and the second operation comprises processing the received data by the GPU.

33. The apparatus according to claim 31, wherein the I/O device comprises a network interface controller (NIC), which couples the computer to a network, and wherein the I/O operation comprises receiving data packets over the network.

34. A computing apparatus, comprising:
a memory;
a first peripheral device, which is configured to receive a request to perform a first operation with respect to specified data and to write to a completion queue in the memory a completion report upon completion of the first operation;

a second peripheral device, which is configured to read the completion report from the memory and, in response to the completion report, to perform a second operation on the specified data; and a central processing unit (CPU), which is configured to record, in response to the completion report, that the request to perform the first operation has been completed, wherein the second peripheral device is configured to poll the completion queue for receipt of the completion report, wherein the CPU is configured to poll the completion queue in addition to polling by the second peripheral device, and wherein the second peripheral device polls the completion queue at a higher frequency than the CPU.

35. A method for interaction by a central processing unit (CPU) and peripheral devices in a computer, the method comprising:
- allocating, in a memory, a work queue for controlling a first peripheral device of the computer;
- preparing, by the CPU, a work request for insertion in the allocated work queue, the work request specifying an operation for execution by the first peripheral device; and
- submitting an instruction, from a second peripheral device of the computer to the first peripheral device, to execute the work request that was prepared by the CPU and thereby to perform the operation specified by the work request,
- wherein preparing the work request comprises writing the work request, by the CPU, to a temporary storage area, and wherein submitting the instructions comprises copying the work request, by the second peripheral device, from the temporary storage area to the work queue, and
- wherein the second peripheral device changes a value of a length field of the copied work request, when copying the work request from the temporary storage area to the work queue.

* * * * *